Sept. 13, 1932.    M. WEIL    1,877,707
TRANSMISSION FOR PHONOGRAPHS
Filed May 19, 1932    2 Sheets-Sheet 1
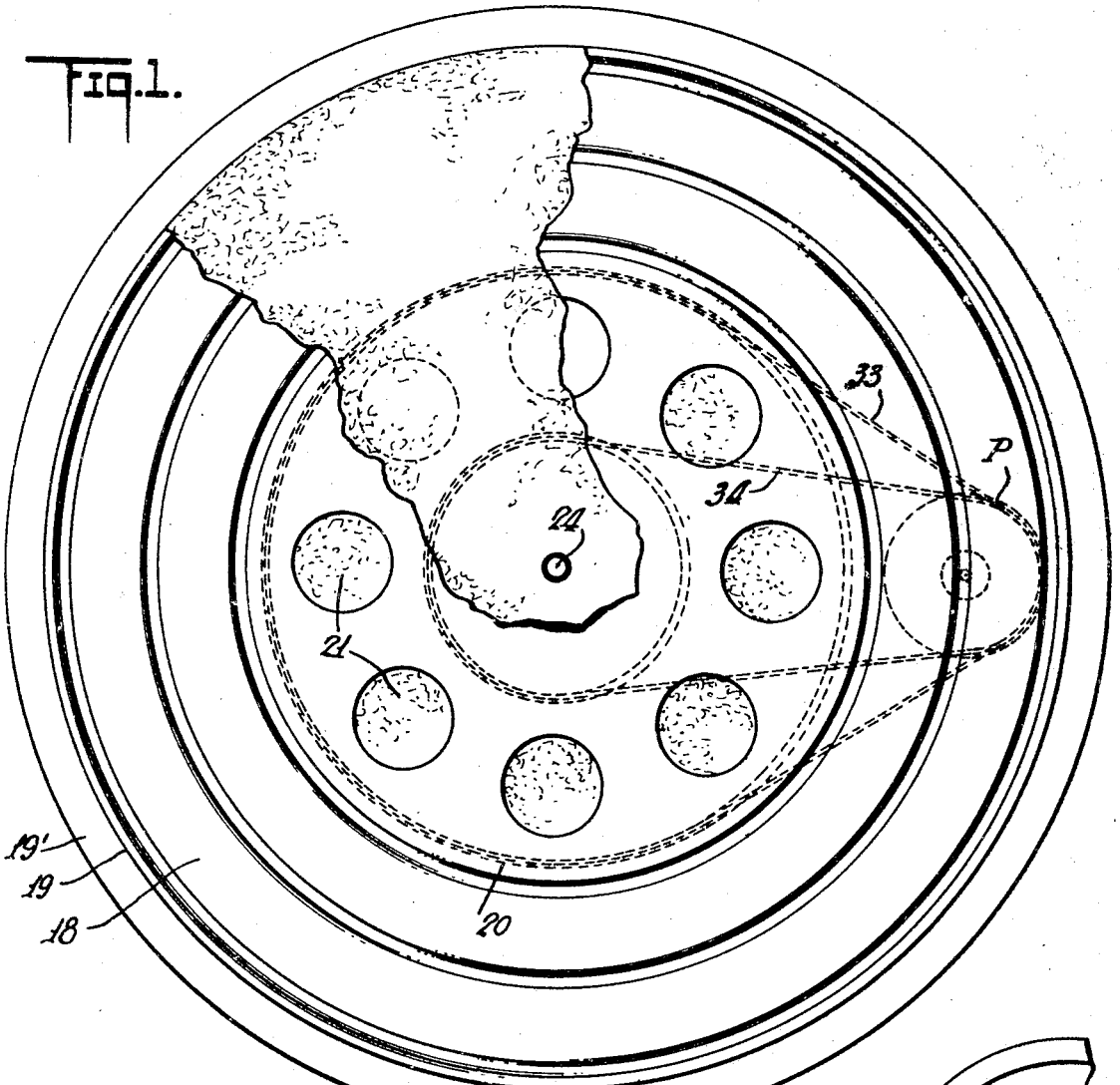
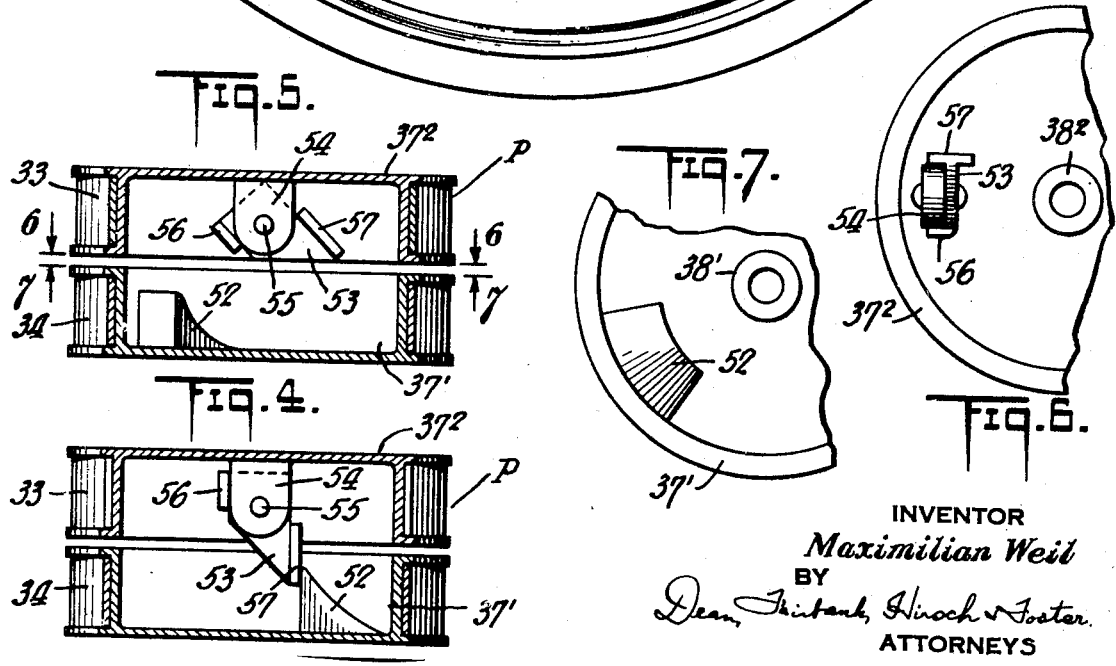
INVENTOR
Maximilian Weil
BY
ATTORNEYS Sept. 13, 1932.  M. WEIL  1,877,707
TRANSMISSION FOR PHONOGRAPHS
Filed May 19, 1932  2 Sheets-Sheet 2
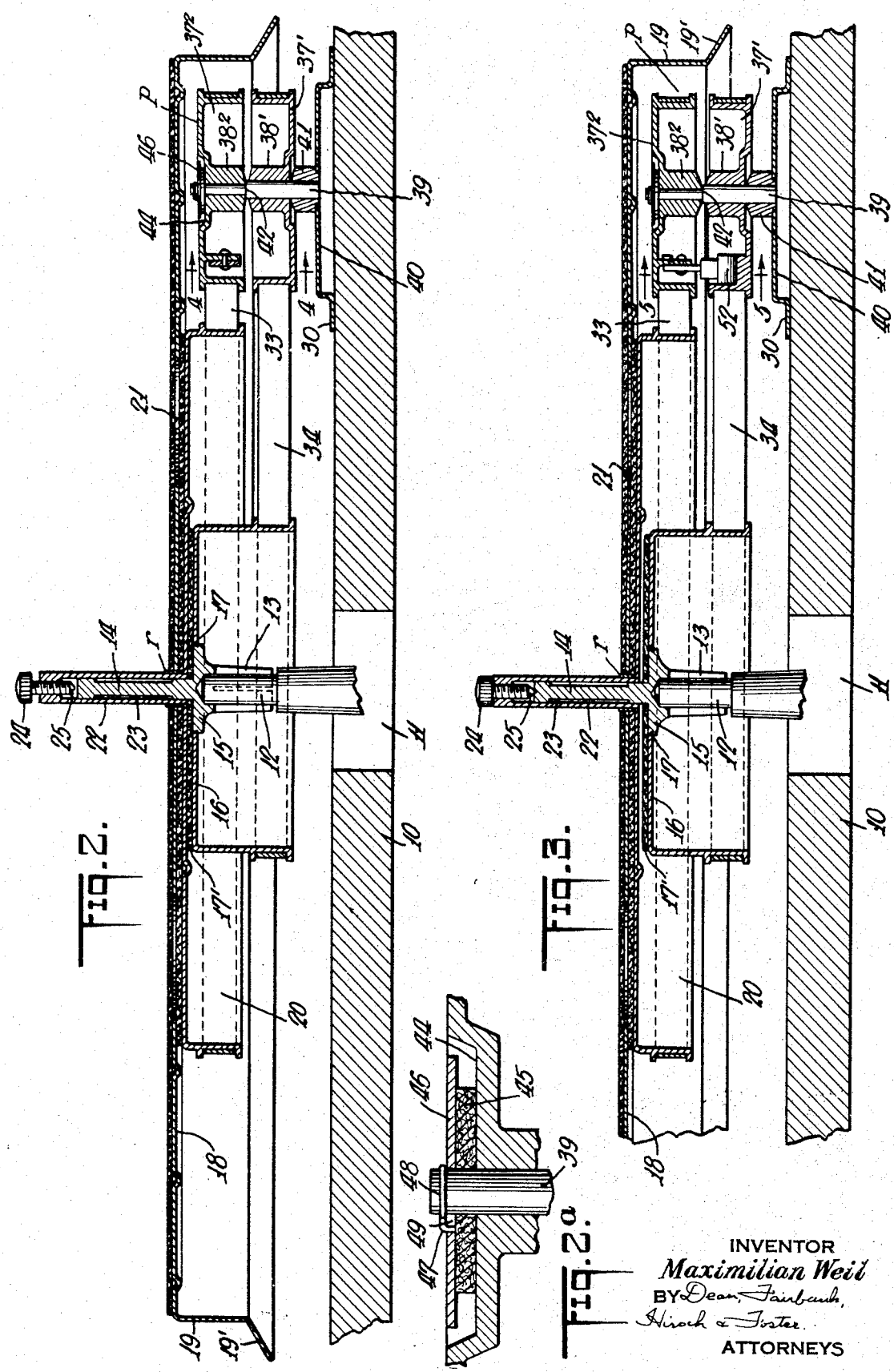
INVENTOR
*Maximilian Weil*
ATTORNEYS Patented Sept. 13, 1932

1,877,707

UNITED STATES PATENT OFFICE

MAXIMILIAN WEIL, OF NEW YORK, N. Y.

TRANSMISSION FOR PHONOGRAPHS

Application filed May 19, 1932. Serial No. 612,259.

My present invention relates primarily to phonographs and more particularly to the turn table driving transmission thereof.

A fundamental object of the invention is to render possible the use of the conventional phonograph and the spring or electric motor thereof, for driving the turn table not only at the intended speed for conventional disc records of the well known type, but also to render the same applicable for the so-called slow speed records which have more recently appeared on the market and which require a fundamental rotational speed of 33⅓ R. P.M. as against 78 R. P. M. for the older type.

A more particular object of the invention is to provide a construction of substantially conventional appearance, of small cost, and light weight, easily placed on old phonographs as replacement for the conventional turn table thereof.

Another object is to provide apparatus of the above type which by a single simple manual operation, can be readily changed over from the fast drive of turn table for conventional records to the slow drive of turn table for the new type of record, and in which the operation of the turn table at the lower speed will not involve any variability of speed or "hunting".

Another object is to provide an installation of the above type, by which the fast driving speed of the motor spindle is in no manner imposed upon the turn table when the latter is to be driven for slow speed operation.

Another object of the invention is to provide an installation of the above type obviating the variability of speed or "hunting" and the noise due to the backlash of gear transmission, etc.

A feature of the invention is the mount of the turn table either on a high friction large area support for direct drive at the rotary speed of the spindle or alternatively at a practically frictionless support, preferably a point support, coaxial therewith and free from engagement with the direct friction drive. By this arrangement the high speed rotary impulse of the drive spindle is effectively isolated with respect to the turn table to permit drive of the latter from a special speed-reducing transmission connected therewith from the drive spindle.

Another feature is the construction of speed reducing transmission which preferably includes a driver of smaller diameter coaxial but rotatable independently of the turn table, a driven member of larger diameter rotatable with the turn table, and an idler laterally of said driving and driven members and in the transmission train between the two, said idler including an over-running clutch preventing reverse driving connection through said idler when the turn table with its larger driven member is rotated at high speed from the spindle.

In a preferred specific embodiment the driving and driven members are drums under the turn table and the idler comprises pulleys mounted at the motor board and under the turn table, and belts connect the elements of the composite pulley with the respective drums. The clutch of the composite idler pulley includes a pendant inertia member pivoted within the upper pulley element and pushed by a tongue in the lower pulley element said member rising under the high speed imposed thereon when the turn table and the larger diameter driven pulley become the driver at high speed operation during which latter action the upper pulley element will therefore revolve at high speed, with the clutch disengaged from the lower pulley element, which latter for each setting is driven at the same speed, from the smaller drum.

Another feature is the particular construction of turn table for the above purpose comprising a mounting hub for telescoping over the driving spindle, a driving drum rigid therewith, a turn table rotatable relative to said drum and resting on a driven drum, a rod rigid with the hub rising through the turn table and a sleeve rigid with the driven drum, encircling the rod and carrying a screw in the upper end with a pointed end contacting the upper end of the rod and adapted when turned to lift the turn table out of engagement with the driven drum and to connect said speed reducing transmission into effective operation.

In the accompanying drawings in which is shown one of various possible embodiments of the several features of the invention:

Fig. 1 is a plan view of the installation with parts broken away, better to reveal the construction, Fig. 2 is a transverse sectional view showing the parts set for fast drive, Fig. 2a is a fragmentary sectional view of a detail on a larger scale, Fig. 3 is a view similar to Fig. 2 showing the parts set for slow drive, Fig. 4 is a transverse sectional view on the line 4—4 of Fig. 2, Fig. 5 is a transverse sectional view taken on the line 5—5 of Fig. 3, Fig. 6 is a fragmentary transverse section taken on line 6—6 of Fig. 5, and Fig. 7 is a view similar to Fig. 6 but taken on the line of 7—7 of Fig. 5.

Referring now to the drawings, there is shown the motor board 10 of a conventional phonograph equipped with a motor (not shown) usually of the conventional spring or electric type, the speed of which is controlled by means not shown. From the motor there extends upwardly through an aperture 11 in the motor board, a driving spindle 12 on which the turn table is ordinarily mounted. The parts thus far described are identical with those of a conventional phonograph and are utilized with my new turn table which replaces the conventional one.

My turn table construction preferably comprises a split hub 13 frictionally fitted over the upper end of the drive spindle 12, which holds the record concentric with the turn table and is therefore standard on all commercial models of phonographs. My turn table has a rod 14 unitary and coaxial therewith and rising therefrom. On flange 15 of the hub rests a sheet metal drum 16 rigidly secured thereto by staking or spinning as at 17.

The drum 16 has cemented to the upper face thereof a covering 17' of felt or other friction material. The turn table 18 is preferably of sheet metal and equipped with a skirt 19. It rests directly upon a drum 20 of larger diameter than drum 16, with a layer of felt 21 cemented thereto, to afford a high friction support for the turn table 18. Welded, brazed, soldered or riveted to the drum 20 is an upstanding sleeve 22 encircling the rod 14 which latter is undercut as at 23 to still further reduce friction with the sleeve 22. A rubber collar $r$ about the lower end of sleeve 22 prevents contact therewith of the turn table 18. The upper end of the sleeve 22 has threaded thereinto and longitudinal thereof a screw 24, the pointed end 25 of which contacts the upper extremity of the rod 14. The turn table though at somewhat higher level than in conventional constructions, yet presents no greater gap relative to the motor board, than is usual, by reason of the oblique rim 19' thereof.

In the setting shown in Fig. 2 the driving spindle 12 through the hub 13, drum 16 and drum 20, drives the turn table 18 directly, at the relatively high speed thereof, in the order of 78 R. P. M., suitable for operation of conventional phonograph records. In the setting of Fig. 3, on the other hand, in which the screw head 24 has been turned slightly to lift the sleeve 22 and with it the drum 20 and turn table 18 through a very small fraction of an inch, the drum 20 no longer contacts the drum 16, and the entire weight of the drum 20 and the turn table 18 with its superposed record is suspended from the point 25 of the screw, coaxially with the turn table. Accordingly the driving spindle 12, the drum 16 and the rod 14, all of which are driven at the normal spindle speed will impose practically no frictional drag upon the turn table and in the latter setting, in the absence of the construction still to be described, the turn table would stand still and not be entrained, even though the driving spindle be operating.

Accordingly in the setting shown in Fig. 3, the turn table will revolve at such speed, slower than the driving spindle, as may be imposed thereon by any auxiliary transmission as may be provided between the spindle and the turn table.

The transmission in the particular embodiment shown is a frictional transmission between the driving drum 16 of similar diameter and the driven drum 20 of larger diameter. For the present purpose, an idler pulley construction shown in its entirety at P is provided, which is secured as at 30 upon the motor board, directly within the periphery of the flanged turn table. The upper belt 33 connects the upper element of the composite pulley structure to the larger or driven drum 20, the lower belt 34 connecting the lower of the pulley elements to the driving or smaller drum element 16.

Each of the pulley elements 37' and $37^2$ is of metal and has a hub 38' and $38^2$. Both hubs are passed over a mounting rod 39 affixed to the base 40. The lower hub 38' rests on a collar 41 staked to the base 40. The upper hub $38^2$ rests on a shoulder 42 on the rod 39. The face of the upper pulley $37^2$ is countersunk at 44 and accommodates preferably an absorbent washer 45 over which is superposed a metal washer 46 and a wire loop 47 encircling a groove 48 in the upper end of rod 39 is locked at one end into notch 49 in washer 46 in order to keep the pulley from hunting vertically and to keep washer 46 from rotating. The extremity of rod 39 is exposed through the hub $38^2$ and washers 45 and 46 so that lubricating oil may be supplied from time to time which will be absorbed by washer 45 and seep to the bearing surface of rod 39.

The composite pulley made up of the pulley elements 37' and 37² includes a driving connection preferably comprising an upstanding tongue 52 extending peripherally in the lower pulley element 37', and a dog 53 pivoted at 55 between ears 54 in the upper pulley element 37². Dog 53 has its lower end in the path of the advanced edge of the tongue 52 and has a tooth 56 contacting ear 54 to limit the pivotal movement, when a pushing impulse is applied to the dog through the tongue 52 as best shown in Fig. 4. The dog 53 has an excess of weight at its lower end as at 57 to act by inertia in a manner more fully described in the operation which follows.

The ratio of the diameters or peripheries of drums 20 and 16 is approximately as 78 is to 33⅓. The drive from the smaller drum 16 through the idler transmission to the larger drum 20 steps down the speed of turn table propulsion from the 78 R. P. M. of the driving spindle to the desired speed of 33⅓ R. P. M.

In operation the motor drives through the spindle 12, hub 13, drum 16, belt 34, pulley 37', tongue 52, dog 54, pulley 37², belt 33 and drum 20 to the turn table 18. Inasmuch as the practically frictionless mount of the turn table as above described prevents entraining the latter with the high speed of the spindle 12 or drum 16, the turn table is now rotated at a speed less than that of the driving spindle in the same ratio as that existing between the drum diameters.

The weight of the larger drum 20, the turn table 18, the record (not shown) thereon, and the sound box or electric pick-up will prevent the rotating parts from "running ahead". The friction on the idler pulley due to the felt washer 45 pressed by loop 47 against the pulley, also contributes to this result.

If now it is desired to play a conventional old type of record at the speed of the driving spindle, it is merely necessary to turn the screw 24 slightly in counter-clockwise direction, thereby permitting the turn table 18 and drum 20 to rest upon the face of the driving drum 16. In this position, shown in Fig. 2, the turn table is rotated at the speed of the driving spindle. The transmission is from spindle 12, through hub 13 to drum 16 on which now rests drum 20, which in turn supports the turn table, the drums and turn table rotating, due to felt friction, in unison.

The pulley 37² will now be driven from the larger drum 20 at a speed greatly in excess of that of the lower pulley 37' which is driven from the drum 16 at the same speed as in the setting of Fig. 3. This differential speed between the two pulley elements is permitted by the fact that the inertia weight of the dog 53 in the fast operation of the upper pulley element will cause said dog to pivot upwardly and rise in the manner shown in Fig. 5 out of the path of the driving tongue 52 of the lower pulley. Accordingly the dog in this case acts as an over-running clutch and will neither tend to drive the lower pulley nor click over the driving tongue 52 thereof. The noise of such clicking would, of course, be objectionable.

In operation on the old style record the speed reducing transmission is in effect short-circuited or eliminated, the drive occurring in this case direct from the spindle to the turn table.

The instrumentality is installed on any conventional phonograph, by simply applying the idler unit P to the motor board, connecting the belts 33 and 34 between the pulleys and the turn table drums and telescoping the hub 13 of the latter over the driving spindle, with the turn table skirt extending over the idler unit.

While in general the drum 20 is to be used in addition to the turn table 18, it is of course understood that in the case of smaller phonographs the drum 20 may itself be used as the turn table either in its present form or with suitably modified rim construction.

It is, of course, within the scope of the invention to provide for the setting of Fig. 3 alone if desired, in order to render an old style phonograph suitable for the new style long-playing record and unsuitable for the old style record. It is however preferred to provide the instrumentality described which serves at will for either style of record.

If desired the sleeve 22 may be slotted to reveal marks (not shown) on the rod 14 enclosed thereby, to serve as a visual indication apart from actual operation as to whether the setting is for high speed or for low speed.

It will thus be seen that there is herein described apparatus in which the several features of this invention are embodied, and which apparatus in its action attains the various objects of the invention and is well suited to meet the requirements of practical use.

As many changes could be made in the above construction, and many apparently widely different embodiments of this invention could be made without departing from the scope thereof, it is intended that all matter contained in the above description or shown in the accompanying drawings shall be interpreted as illustrative and not in a limiting sense.

Having thus described my invention, what I claim as new and desire to secure by Letters Patent is:—

1. In a phonograph of the type comprising a driving motor, constructed for speed thereof within a narrow range, a turn table shaft driven from the motor, a turn table thereon adapted to be driven by said shaft and at the rotary speed of the latter, a speed reducing transmission between the shaft and the turn table and means for placing said transmission at will into or out of operative connection.

2. In a phonograph of the type comprising a driving motor, constructed for speed thereof within a narrow range, a turn table shaft driven from the motor, a turn table thereon and a speed reducing transmission between the shaft and the turn table, and means for short circuiting the speed reducing transmission at will for fast drive of the turn table.

3. A phonograph for use alternatively for conventional phonograph records and for modern slow-speed records, said phonograph including a conventional motor and a turn table shaft, a direct connection and a connection of fixed speed reducing ratio between the shaft and the turn table and manually controlled means for selectively throwing said direct or said speed reducing connection into operation respectively for fast speed of the turn table and for slow speed thereof.

4. A phonograph of the type including a motor board, a conventional motor thereunder, a driving spindle driven therefrom and protruding above the motor board, a turn table on said spindle adapted to be driven by said spindle at the rotary speed of the latter, a friction driven speed reducing transmission of definite ratio for driving connection between the spindle and the turn table and means for placing said transmission at will into or out of operative connection.

5. A phonograph of the type including a motor board, a conventional motor thereunder, a driving spindle driven therefrom and protruding above the motor board, a turn table supported upon said spindle and a friction driven speed reducing transmission of definite ratio for driving connection between the spindle and the turn table, said turn table having a low-friction pivot mount with respect to the spindle, thereby to avoid imposing the relatively fast rotational speed of the spindle on the turn table.

6. A phonograph of the type including a motor board, a driving motor thereunder, a spindle driven therefrom and protruding thereabove, a turntable on said spindle adapted to be driven directly therefrom at the rotary speed thereof, and an alternative drive between the spindle and said turn table having a fixed speed changing ratio effective to cause driving of the turn table at a rotary speed having a definite ratio with respect to that of the spindle.

7. In a phonograph the combination of a motor board, an upstanding spindle, a turn table having an axial sleeve encircling said spindle and a sharp point mount in the upper end of said sleeve resting on top of said spindle for substantially frictionless mount of the turn table and a speed reducing driving transmission between the spindle and the turn table.

8. In a phonograph construction the combination of a motor board, a driving spindle extending upward therefrom, a turn table having a central sleeve encircling said spindle, but having clearance with respect thereto for the major part of the length thereof, a screw extending longitudinally in the upper end of said sleeve and having a sharp point resting on the upper end of said spindle for sustaining the weight of the turn table upon the spindle substantially without frictional drag from the spindle to the turn table, and a friction driving transmission between the spindle and the turn table.

9. In a phonograph the combination of a motor board, a conventional motor and a conventional driving spindle protruding upward therefrom, a composite turn table including a central sheet metal drum, a carrying hub therefor, frictionally telescoped over the driving spindle, said hub having an upstanding rod, said turn table having an upstanding central sleeve encircling said rod and closed at its upper end, a pointed screw through said closed end of the sleeve adapted to sustain the entire weight of said turn table upon the upper end of said rod, there being clearance between the turn table and said drum whereby the weight of the turn table may, depending on the setting of the screw, be rested entirely on top of the rod for a low friction mounting connection or entirely on the drum for a high friction driving connection, and a speed reducing friction transmission for driving said turn table from said hub when the turn table is rested upon the rod.

10. As an article of manufacture, a composite turn table for a conventional phonograph, and adapted alternatively for normal speed records, and for slow speed records, said turn table including a hub with a socket adapted to be telescoped over the drive spindle and a rod rising from said hub, a drum affixed to said hub and concentric therewith, a turn table encircling said rod rotatable relative to said drum and having unitary therewith a sleeve encircling said rod, a screw through the upper end and longitudinal of said sleeve having a sharp point adapted to rest upon said rod, whereby depending on the setting of said screw, the turn table may be supported from the screw point or may be rested upon the drum.

11. As an article of manufacture, a composite turn table for a conventional phonograph, and adapted alternatively for normal speed records, and for slow speed records, said turn table including a hub with a socket adapted to be telescoped over the drive spindle, a drum affixed to said hub and concentric therewith, a rod rising from said hub, a turn table encircling said rod rotatable relative to said drum and having unitary therewith a sleeve encircling said rod, a screw through the upper end and longitudinal of said sleeve having a sharp point adapted to rest upon said rod, whereby depending on the setting of said screw, the turn table may be supported from the screw point or may be rested upon the drum, and a friction-drive speed reducing transmission for propelling the turn table from the drive spindle when the former is lifted from the drum and rests upon the screw point.

12. In a phonograph construction, a composite turn table including a drum, a turn table proper concentric therewith, a hub adapted to be telescoped over a drive spindle, extending through said drum and turn table and connecting said elements into an assembly with said turn table freely rotatable relative to said drum, means affording a low friction thrust support for said turn table free from engagement with said drum, a friction drive speed reducing transmission between said drum and said turn table, and manually controlled means for lowering said turn table to rest upon and be driven directly from said drum said speed reducing transmission having an over-running element to place the same out of operation when the turn table is driven directly from said drum.

13. In a phonograph the combination of a driving spindle, a turn table, two alternative transmissions between the spindle and said turn table, one of said transmissions comprising a direct friction drive through the resting surface under said turn table, the other of said transmissions being of the speed reducing type and including a driver of small diameter and a driven member of larger diameter both concentric with said turn table, and an idler transmitting the drive from the small driver to the larger driven member, said transmission being constructed and arranged for inoperativeness thereof when the turn table is in direct driving position.

14. In a phonograph construction, the combination of a motor board, a driving spindle protruding therefrom, a turn table having a pair of drums thereunder and concentric therewith, the larger of said drums sustaining said turn table at all times and the smaller of said drums being rotatable with respect thereto, means for sustaining said larger drum at will either upon said smaller drum or upon a low friction suspension free of said drum, transmission pulleys laterally of said drums, axially aligned driving belts between the respective drums and pulleys and a driving connection between the pulleys to permit driving the larger drum when raised with respect to said smaller drum by a transmission from said smaller drum through said pulleys to said larger drum.

15. In a phonograph the combination of a driving spindle, a turn table, two alternative transmissions between the spindle and the turn table, one of said transmissions comprising a direct friction drive through the resting surface under said turn table, the other of said transmissions being of the speed reducing type and including a driver of small diameter and a driven member of larger diameter both concentric with said turn table, and an idler transmitting the drive from the small driver to the larger driven member, said transmission being constructed and arranged for inoperativeness thereof when the turn table is in direct driving position, said turn table having a skirt, said driving member, said driven member and said idler transmission being all within the confines of said skirt.

16. In a phonograph, the combination of a turn table, a high friction driving support therefor, a low friction support therefor, means for raising and lowering said turn table at will slightly for alternatively positioning it on the high friction or on the low friction support, and a speed reducing friction drive transmission for operating the turn table at reduced speed when on the low friction support.

17. In a phonograph, the combination of a turn table, a high friction driving support therefor, a low friction support therefor, means for raising and lowering said turn table at will slightly for alternatively positioning it on the high friction or on the low friction support, and a speed reducing friction drive transmission for operating the turn table at reduced speed when on the low friction support, said transmission having a part adapted to over-run at high speed operation of the turn table.

18. In a phonograph, the combination of a driving spindle, a turn table concentric therewith, a high friction support for said turn table to permit direct drive thereof at the rotary speed of said spindle, a low friction central point support for said turn table, manual means to effect a slight displacement of said turn table to change the support thereof from the high friction to the point support, and a speed reducing transmission to operate said turn table from said drive spindle while resting on the point support.

19. In a phonograph, the combination of a drive spindle, a turn table having a friction mount support for driving thereof at the rotary speed of said spindle, an alternative screw point support coaxially of said turn table for maintaining the latter free from said direct friction drive, a friction speed reducing transmission for operating said turn table at reduced speed when sustained on said point support, said transmission including a drive drum of small diameter a driven drum of larger diameter both coaxial with said turntable and the latter substantially fixed with respect thereto, a pair of pulleys laterally of said drums, belts connecting said drums with the respective pulleys and an over-running clutch member between said pulleys, for direct driving connection from the smaller drum to the larger drum and adapted to over-run when the large drum is directly driven with the turn table.

20. In a phonograph, the combination of a driving spindle, a turn table having a direct friction support for driving thereof at the rotary speed of said spindle, a point support coaxial with said turn table adapted to sustain the latter free from engagement with said friction support, a speed reducing transmission between the drive spindle and the turn table, operative in the latter position thereof, said transmission including a driving member of smaller diameter rotatable relative to said turn table a driven member of larger diameter rotatable with said turn table, a composite idler in the driving train between the driving and the driven member, said idler including a clutch adapted to over-run at such time as the driven member of larger diameter would otherwise tend to drive the driving member of smaller diameter.

21. The combination set forth in claim 20, in which the over-running clutch comprises a pivot inertia member on the element of the pulley associated with the driven member, and adapted by virtue of its inertia to rise out of driving coaction with the companion pulley element, to clear the driven member and thus permit rotation thereof at higher speed than the companion element while the turn table is operating at high speed.

22. In a transmission for phonographs, the combination of a composite idler pulley including a support stud, a pair of superposed pulley hubs thereon, pulley elements on the respective sleeves a driving tongue on the lower of said pulleys, a pivoted pending clutch member within the upper of said pulleys, stop means for arresting said clutch member in dependent position for positive drive from the driving tongue of the lower pulley, whereby upon fast drive of the upper pulley the clutch member by virtue of the inertia of its lower portion will rise out of the range of the driving stop of the lower pulley.

23. In a phonograph motor the combination of a motor board, a driving spindle rising therefrom, a driving hub telescoped on said spindle, a drum rigid with said hub, a turn table having a skirt and adapted to rest on said drum to be driven therefrom, an upstanding rod rigid with said hub, a sleeve rigid with said turn table and encircling said rod, a pointed screw in the upper end of said sleeve resting on the end of said rod and adapted by turning thereof to raise said turn table slightly out of contact with said drum, a second drum of larger diameter concentric and rigid with said turn table, a compound idler pulley structure, supported at said motor board under the skirt of said turn table, transmission belts from the respective drums to the respective elements of said pulley, said pulley including an over-running inertia transmission clutch effective for driving in the speed reducing direction and over-running in the opposite direction.

Signed at New York in the county of New York and State of New York this 17th day of May, A. D. 1932.

MAXIMILIAN WEIL.